Dec. 26, 1950     E. M. CAMPBELL     2,535,564
AUTOMOBILE SUPPORTING RACK FOR FIREARMS AND THE LIKE
Filed Oct. 1, 1948     2 Sheets-Sheet 1
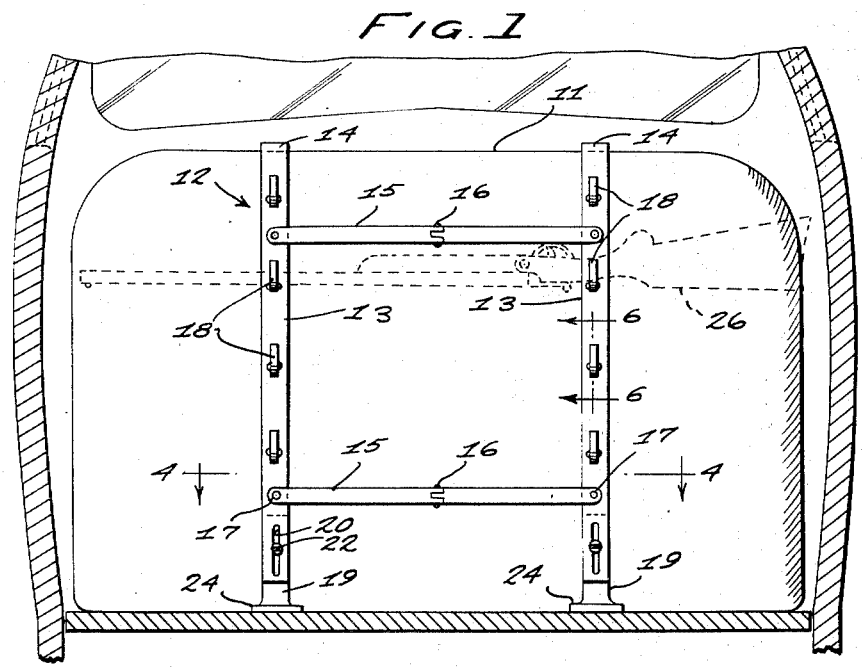
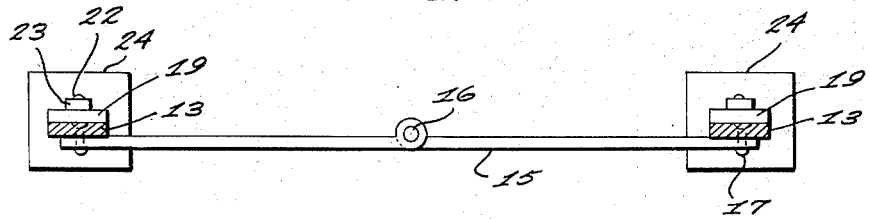
INVENTOR.
*Earl M. Campbell*
BY
*McMorrow, Berman & Davidson*
ATTORNEYS Dec. 26, 1950 — E. M. CAMPBELL — 2,535,564
AUTOMOBILE SUPPORTING RACK FOR FIREARMS AND THE LIKE
Filed Oct. 1, 1948 — 2 Sheets-Sheet 2
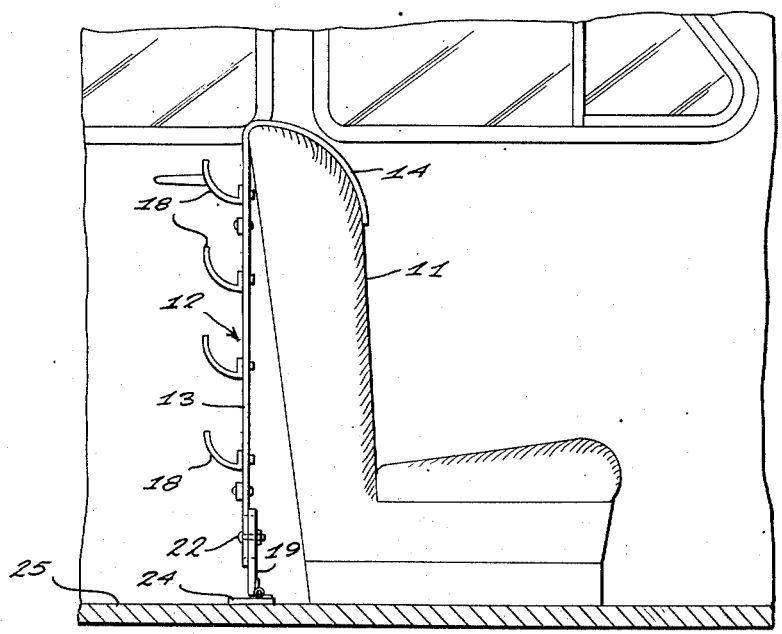
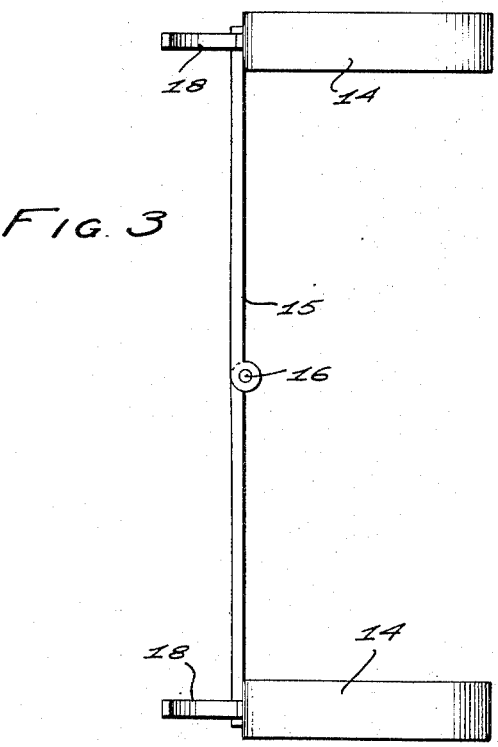
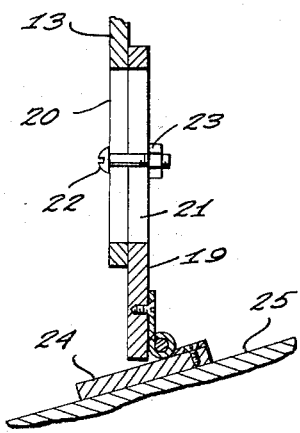
INVENTOR.
Earl M. Campbell
BY
McMorrow, Berman & Davidson
ATTORNEYS Patented Dec. 26, 1950

2,535,564

UNITED STATES PATENT OFFICE 2,535,564

AUTOMOBILE SUPPORTING RACK FOR FIREARMS AND THE LIKE

Earl M. Campbell, Detroit Lakes, Minn.

Application October 1, 1948, Serial No. 52,286

3 Claims. (Cl. 224—42.42)

1

This invention relates to supporting racks, and more particularly to supporting racks for use in passenger automobiles for supporting guns and similar objects.

A main object of the invention is to provide a novel and improved rack device for use in automobiles, said rack device being very simple in construction, easy to install and readily collapsible to a compact size when not in use so that it may be conveniently stored.

A further object of the invention is to provide an improved rack device which is adapted to be mounted on the top of the front seat of an automobile and which is especially useful as a gun rack for hunting parties and also as a rack for fishing tackle and other objects, said device being inexpensive to manufacture, sturdy in construction and adjustable to fit the space behind the front seat of a car, whereby said space may be efficiently utilized.

Further objects and advantages of the invention will become apparent from the following description and claims, and from the accompanying drawings, wherein:

Figure 1 is a fragmentary transverse vertical cross-sectional view taken through an automobile equipped with a rack device constructed in accordance with the present invention, the rack device being shown in elevational view.

Figure 2 is a side elevational view of the front seat of the automobile of Figure 1, showing the rack device in side elevation.

Figure 3 is a top plan view of the rack device of Figures 1 and 2.

Figure 4 is an enlarged cross-sectional detail view taken on line 4—4 of Figure 1.

Figure 5 is an enlarged vertical cross-sectional detail view taken through one of the adjustable foot portions of the rack device of Figures 1 and 2.

Figure 6 is a fragmentary enlarged cross-sectional detail view taken on line 6—6 of Figure 1.

Referring to the drawings, and more particularly to Figures 1 and 2, 11 designates the front seat of a conventional passenger automobile. Designated generally at 12 is the rack device, said device comprising the upright bar members 13, 13 formed at their top ends with hook portions 14 shaped to fit over the top of the front seat 11. Connecting the upright bar members 13, 13 are horizontal bar members 15, 15, said horizontal bar members being vertically hinged at their intermediate portions, as shown at 16, 16, so that the rack device may be folded at said intermediate portions. The ends of the respective bar members 15 are pivotally connected to the respective upright bar members 13, as shown at 17, by suitable bolts or rivets, whereby the rack device after being folded to a collapsed position around the hinge elements 16, 16, may be further collapsed by swinging the folded bar members 15 downwardly.

Secured to the upright bar members 13, 13 are the spaced rearwardly extending upwardly facing hook members 18, the hook members 18 of one upright bar member being horizontally aligned with the respective hook members 18 of the other upright bar member.

Designated at 19, 19 are adjustable foot members secured to the lower ends of the respective upright bar members 13. As shown in Figure 5, the bar members 13 and the foot members 19 are formed with registrable vertical slots, shown respectively at 20 and 21, and are secured together by a bolt 22 passing through the slots, said bolt being provided with a clamping nut 23. Hinged to the lower end of each member 19 is a flat foot-piece 24 which is in flat surface abutment with the floor of the automobile, shown at 25.

When the rack device is installed on the back of the front seat 11 of an automobile, as shown in Figure 1, it may be employed to support a plurality of guns, positioned as shown in dotted view at 26, on the respective pairs of horizontally aligned hook members 18. This makes the rack device especially useful to hunting parties, whereby each member of the party may place his gun on the rack in readiness for use, eliminating the need for carrying the gun when not in use and thereby increasing the amount of leg room in the back of the car, as well as reducing the possibility of injury by accidental discharge of a gun. The rack device may also be employed for supporting other elongated objects such as fishing tackle and the like.

When not in use, the rack device may be collapsed by folding it around the vertical hinges 16, 16 and bringing the upright bar members 13, 13 toward each other. The hinges 16, 16 are located at points slightly offset from the midpoints of the horizontal bar members 15 so that clearance will be provided for the hook members 18 of the respective upright members 13 to move past each other as said upright members are brought toward each other. When thus folded, the hook members 18 of one upright member 13 will abut the other upright member and vice versa. The folded horizontal bar members 15 may then be swung downwardly as far as they will go to complete the folding of the rack device.

While a specific embodiment of a supporting rack for use in passenger automobiles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An automobile rack device comprising a pair of upright bar members formed at their top ends with hook elements fitting over the top of the front seat of an automobile, a foot member adjustably secured to the lower end of each upright member, said foot member having a flat foot piece hinged thereto, a plurality of rearwardly extending upwardly facing hook members on each upright bar member, and a pair of horizontal cross bars connecting said upright bar members.

2. An automobile rack device comprising a pair of upright bar members formed at their top ends with hook elements fitting over the top of the front seat of an automobile, a foot member adjustably secured to the lower end of each upright member said foot member having a flat foot piece hinged thereto, a plurality of rearwardly extending upwardly facing hook members on each upright bar member, and a plurality of horizontal cross bars pivotally secured at their ends to the respective upright members, said cross bars being vertically hinged at their intermediate portions.

3. An automobile rack device comprising a pair of upright bar members formed at their top ends with hook elements fitting over the top of the front seat of an automobile, a foot member adjustably secured to the lower end of each upright member, said foot member having a flat foot piece hinged thereto, a plurality of rearwardly extending upwardly facing hook members on each upright bar member, and a plurality of horizontal cross bars pivotally secured at their ends to the respective upright members, said cross bars being vertically hinged at their intermediate portions at vertically aligned points spaced slightly from the midpoints of the cross bars.

EARL M. CAMPBELL.

REFERENCES CITED

The following references are of record in the file of this patent:

UNITED STATES PATENTS

| Number | Name | Date |
|---|---|---|
| 630,734 | Oothout | Aug. 8, 1899 |
| 1,215,652 | Hale | Feb. 13, 1917 |
| 1,380,570 | Lehman | June 7, 1921 |
| 1,556,624 | Pavenick | Oct. 13, 1925 |
| 1,584,161 | Bear | May 11, 1926 |
| 1,722,122 | Wilson | July 23, 1929 |
| 2,144,772 | Plants | Jan. 24, 1939 |
| 2,173,569 | Troendle | Sept. 19, 1939 |